(12) United States Patent
Yi et al.

(10) Patent No.: US 12,148,172 B2
(45) Date of Patent: Nov. 19, 2024

(54) DISPLAY APPARATUS, VIRTUAL REALITY DISPLAY SYSTEM HAVING THE SAME AND METHOD OF ESTIMATING USER MOTION BASED ON INPUT IMAGE

(71) Applicants: Samsung Display Co., Ltd., Yongin-Si (KR); Konkuk University Industrial Cooperation Corp., Seoul (KR)

(72) Inventors: Yongwoo Yi, Hwaseong-si (KR); Eun Yi Kim, Seoul (KR); Young-Jun Seo, Suwon-si (KR)

(73) Assignees: SAMSUNG DISPLAY CO., LTD., Gyeonggi-Do (KR); KONKUK UNIVERSITY INDUSTRIAL COOPERATION CORP., Seoul (KR)

( * ) Notice: Subject to any disclaimer, the term of this patent is extended or adjusted under 35 U.S.C. 154(b) by 397 days.

(21) Appl. No.: 17/568,202

(22) Filed: Jan. 4, 2022

(65) Prior Publication Data

US 2022/0215559 A1 Jul. 7, 2022

(30) Foreign Application Priority Data

Jan. 5, 2021 (KR) .................. 10-2021-0001066

(51) Int. Cl.
*G06T 7/207* (2017.01)
*G02B 27/01* (2006.01)
*G06T 3/40* (2024.01)
*G06V 10/46* (2022.01)

(52) U.S. Cl.
CPC .......... *G06T 7/207* (2017.01); *G02B 27/0172* (2013.01); *G06T 3/40* (2013.01); *G06V 10/462* (2022.01); *G06T 2207/20* (2013.01)

(58) Field of Classification Search
CPC ....... G06T 7/207; G06T 3/40; G06T 2207/20; G02B 27/0172; G06V 10/462; G06V 10/50; G06V 40/20
See application file for complete search history.

(56) References Cited

U.S. PATENT DOCUMENTS

| 6,859,494 | B2 | 2/2005 | Panusopone et al. |
| 2018/0275766 | A1* | 9/2018 | Condolo ............... G06F 3/0304 |
| 2019/0089923 | A1* | 3/2019 | Katano .............. G06V 10/7715 |
| 2019/0188474 | A1* | 6/2019 | Zahnert .................. G06F 3/012 |
| 2020/0084427 | A1* | 3/2020 | Sun ......................... G06N 3/045 |
| 2021/0383758 | A1* | 12/2021 | Yin ....................... G09G 3/3233 |
| 2021/0398294 | A1* | 12/2021 | Cui ......................... G06T 7/174 |

(Continued)

FOREIGN PATENT DOCUMENTS

| JP | 4623199 B2 | 2/2011 |
| KR | 100551826 B1 | 2/2006 |
| KR | 1020190078672 A | 7/2019 |

*Primary Examiner* — Ming Y Hon
(74) *Attorney, Agent, or Firm* — CANTOR COLBURN LLP

(57) ABSTRACT

A display apparatus includes a display panel, a driving controller and a data driver. The display panel displays an image based on input image data. The driving controller generates a data signal based on the input image data, determines an optical flow based on previous frame data of the input image data and present frame data of the input image data and determines a user's self-motion using the optical flow. The data driver converts the data signal to a data voltage and outputs the data voltage to the display panel.

18 Claims, 10 Drawing Sheets

(56) References Cited

U.S. PATENT DOCUMENTS

| | | | |
|---|---|---|---|
| 2022/0198627 A1* | 6/2022 | Rao Padebettu | G06T 5/80 |
| 2022/0360715 A1* | 11/2022 | Xu | H04N 23/632 |
| 2024/0094062 A1* | 3/2024 | Jiao | G01K 11/00 |

* cited by examiner

FIG. 10

| TOP1 & 3 - SCORE | COMPARATIVE EMBODIMENT | | | PRESENT EMBODIMENT | | |
|---|---|---|---|---|---|---|
| | TOP1 | TOP3 | DISTANCE | TOP1 | TOP3 | DISTANCE |
| LEVEL3(480 X 270) | 41.7% | 66.0% | 1.266 | 71.5% | 95.2% | 0.508 |
| LEVEL4(240 X 135) | 74.9% | 96.5% | 0.440 | 76.0% | 97.0% | 0.429 |
| LEVEL5(120 X 67) | 65.0% | 92.0% | 0.551 | 75.5% | 96.9% | 0.436 |

FIG. 11

| AVERAGE SPEED (ms) | COMPARATIVE EMBODIMENT | | | PRESENT EMBODIMENT | | |
|---|---|---|---|---|---|---|
| | MAP1 | MAP2 | AVERAGE TIME | MAP1 | MAP2 | AVERAGE TIME |
| LEVEL3 (480 X 270) | 28.3 | 28.6 | 28.5 | 31.0 | 34.3 | 32.6 |
| LEVEL4 (240 X 135) | 7.5 | 7.0 | 7.3 | 7.5 | 7.7 | 7.6 |
| LEVEL5 (120 X 67) | 1.4 | 1.4 | 1.4 | 1.4 | 1.4 | 1.4 |

# DISPLAY APPARATUS, VIRTUAL REALITY DISPLAY SYSTEM HAVING THE SAME AND METHOD OF ESTIMATING USER MOTION BASED ON INPUT IMAGE

This application claims priority to Korean Patent Application No. 10-2021-0001066, filed on Jan. 5, 2021, and all the benefits accruing therefrom under 35 U.S.C. § 119, the content of which in its entirety is herein incorporated by reference.

BACKGROUND

1. Field

Embodiments of the invention relate to a display apparatus, a virtual reality display system including the display apparatus and a method of estimating a user motion based on an input image using the display apparatus. More particularly, embodiments of the invention relate to a display apparatus that estimates a user's self-motion based on an input image without a sensor, a virtual reality display system including the display apparatus and a method of estimating a user motion based on input image using the display apparatus.

2. Description of the Related Art

Recently, as consumers' demand for virtual reality increases, a display system which enables a user to experience the virtual reality (e.g., a head mounted display ("HMD") system, a virtual reality ("VR") system, etc.) has been developed. Generally, the viewer wears a glasses-like display system and watches an image displayed by a display device included in the glasses-like display system to experience the virtual reality.

SUMMARY

When a movement of an image displayed by a display device included in a glasses-like display system for virtual reality is large but a movement of the user is small, a user may experience a motion sickness and a dizziness. Thus, it is desired to accurately determine the user's self-motion.

Embodiments of the invention provide a display apparatus estimating a user's self-motion based on an input image without using a sensor.

Embodiments of the invention also provide a virtual reality display system including the display apparatus.

Embodiments of the invention also provide a method of estimating a user motion based on an input image using the display apparatus.

In an embodiment of a display apparatus according to the invention, the display apparatus includes a display panel, a driving controller and a data driver. In such an embodiment, the display panel displays an image based on input image data. In such an embodiment, the driving controller generates a data signal based on the input image data, determines an optical flow based on previous frame data of the input image data and present frame data of the input image data and determines a user's self-motion using the optical flow. In such an embodiment, the data driver converts the data signal to a data voltage and outputs the data voltage to the display panel.

In an embodiment, the driving controller may include an optical flow estimator which determines the optical flow based on the previous frame data of the input image data and the present frame data of the input image data in a unit of a pixel and a feature extractor which extracts features to determine a motion type and a motion direction in the image from the optical flow.

In an embodiment, the optical flow estimator may apply a high boost filter to the input image data and determine a first optical flow of first high-boosted image data generated by applying the high boost filter to the input image data. In such an embodiment, the optical flow estimator may apply the high boost filter to first resized data having a reduced size from the input image data and determine a second optical flow of second high-boosted image data generated by applying the high boost filter to the first resized data. In such an embodiment, the optical flow estimator may estimate the optical flow of the input image data based on the first optical flow and the second optical flow.

In an embodiment, the optical flow estimator may estimate the optical flow of the input image data by multiplying the second optical flow by a weight and adding the first optical flow thereto.

In an embodiment, the weight may be greater than one.

In an embodiment, the optical flow estimator may apply the high boost filter to second resized data having a reduced size from the first resized data and determine a third optical flow of third high-boosted image data generated by applying the high boost filter to the second resized data. In such an embodiment, the optical flow estimator may estimate the optical flow of the input image data based on the first optical flow, the second optical flow and the third optical flow.

In an embodiment, the optical flow estimator may apply the high boost filter to third resized data having a reduced size from the second resized data and determine a fourth optical flow of fourth high-boosted image data generated by applying the high boost filter to the third resized data. In such an embodiment, the optical flow estimator may estimate the optical flow of the input image data based on the first optical flow, the second optical flow, the third optical flow and the fourth optical flow.

In an embodiment, the optical flow estimator may vary a number of resizing operations based on the input image data.

In an embodiment, when the input image data is denoted by ORIGINAL, a result of applying a low pass filter to the input image data is denoted by LOW PASS, a high boost parameter is denoted by $\beta$, a result of applying the high boost filter to the input image data is denoted by HIGH BOOST, the following equation may be satisfied: HIGH BOOST=$\beta \times$ ORIGINAL−LOW PASS.

In an embodiment, the high boost parameter $\beta$ may be greater than one.

In an embodiment, the feature extractor may be which generate a saliency map representing the motion direction and a motion magnitude in the image from the optical flow.

In an embodiment, when the saliency map of the present frame data is denoted by Saliency_map(t), an average of the saliency map from a present frame to k previous frames is denoted by Average(t−k;t), and a self-motion saliency map of the present frame data is denoted by Saliency_Difference(t), the following equation may be satisfied: |Saliency_map(t)−Average(t−k;t)|=Saliency_Difference(t).

In an embodiment, the feature extractor may generate a histogram of direction representing a frequency of each direction of the optical flow.

In an embodiment, when all of components of the histogram of direction are less than a threshold value, the feature extractor may determine the present frame data as a scene motion in which the user's self-motion is less.

In an embodiment, when at least one of the components of the histogram of direction is greater than the threshold value, the feature extractor may determine that the present frame data include the user's self-motion.

In an embodiment, when at least one of the components of the histogram of direction is greater than the threshold value, the feature extractor may be which determine a direction having a greatest frequency among the components of the histogram of direction as a direction of the user's self-motion.

In an embodiment of a virtual reality display system according to the invention, the virtual reality display system includes a lens unit, a display apparatus and a housing. In such an embodiment, the display apparatus includes a display panel, a driving controller and a data driver. In such an embodiment, the display panel displays an image based on input image data. In such an embodiment, the driving controller generates a data signal based on the input image data, determines an optical flow based on previous frame data of the input image data and present frame data of the input image data and determines a user's self-motion using the optical flow. In such an embodiment, the data driver converts the data signal to a data voltage and to output the data voltage to the display panel. In such an embodiment, the housing receives the lens unit and the display apparatus.

In an embodiment of a method of estimating a user motion based on an input image according to the invention, the method includes determining an optical flow based on previous frame data of input image data and present frame data of the input image data in a unit of a pixel, extracting features from the optical flow to determine a motion type and a motion direction in an image and determining a user's self-motion using the features.

In an embodiment, the determining the optical flow in the unit of the pixel may include applying a high boost filter to the input image data, determining a first optical flow of first high-boosted image data generated by applying the high boost filter to the input image data, generating first resized data having a reduced size from the input image data, applying the high boost filter to the first resized data, determining a second optical flow of second high-boosted image data generated by applying the high boost filter to the first resized data and operating the first optical flow and the second optical flow.

In an embodiment, the extracting features from the optical flow may include generating a histogram of direction representing a frequency of each direction of the optical flow. In such an embodiment, the determining the user's self-motion using the features may include determining that the present frame data include the user's self-motion when at least one of components of the histogram of direction is greater than a threshold value.

According to embodiments of the display apparatus, the virtual reality display system including the display apparatus, the method of estimating a user motion based on an input image using the display apparatus, the input image data provided to the user may be analyzed and the user's self-motion may be estimated based only on the analyzed input image data in a real time. In such embodiments, the amount of computation for estimating the user's self-motion may be reduced and the accuracy of the estimation of the user's self-motion may be enhanced.

In such embodiments, the user's self-motion may be estimated based only on the input image data so that the user's self-motion may be estimated without using a head tracking apparatus or an acceleration sensor.

In such embodiments, based on the user's self-motion estimation, the motion sickness and the dizziness which may be occurred to the user in the virtual reality display system may be reduced.

BRIEF DESCRIPTION OF THE DRAWINGS

The above and other features of embodiments of the invention will become more apparent by describing in detailed embodiments thereof with reference to the accompanying drawings, in which:

FIG. 10 is a table illustrating estimation accuracies of a user's self-motion according to a comparative embodiment and an embodiment according to the invention; and FIG. 11 is a table illustrating estimation times of the user's self-motion according to a comparative embodiment and an embodiment according to the invention.

DETAILED DESCRIPTION INVENTION

Figure 1:
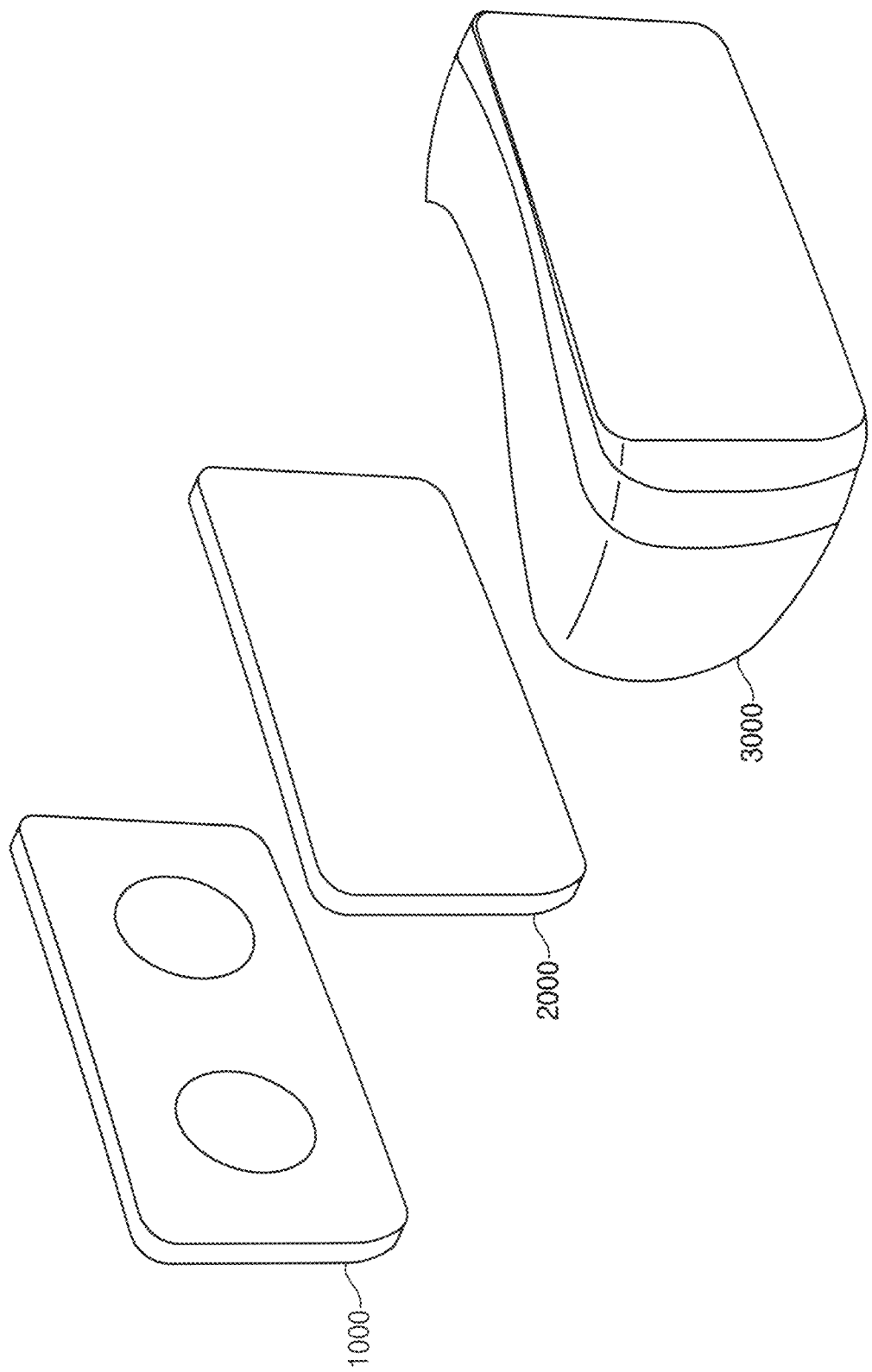
FIG. 1 is a perspective view illustrating a virtual reality display system according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a block diagram illustrating a virtual reality display system according to an embodiment of the invention.

Referring to FIG. 1, an embodiment of the virtual reality display system includes a lens unit 1000, a display apparatus 2000 and a housing 3000. The display apparatus 2000 is disposed adjacent to the lens unit 1000. The housing 3000 may receive the lens unit 1000 and the display apparatus 2000. In an embodiment, the lens unit 1000 and the display apparatus 2000 may be received in a first side of the housing 3000 as shown in FIG. 1, but the invention may not be limited thereto. Alternatively, the lens unit 1000 may be received in a first side of the housing 3000 and the display apparatus may be received in a second side of the housing 3000 opposite to the first side of the housing 3000. In an embodiment, where the lens unit 1000 and the display apparatus 2000 are received in the housing 3000 in opposite sides, respectively, the housing 3000 may have a transmission area to transmit a light.

In one embodiment, for example, the virtual reality display system may be a head mount display system which is wearable on a head of a user. Although not shown in figures, the virtual reality display system may further include a head band to fix the virtual reality display system on the head of the user.

Figure 2:
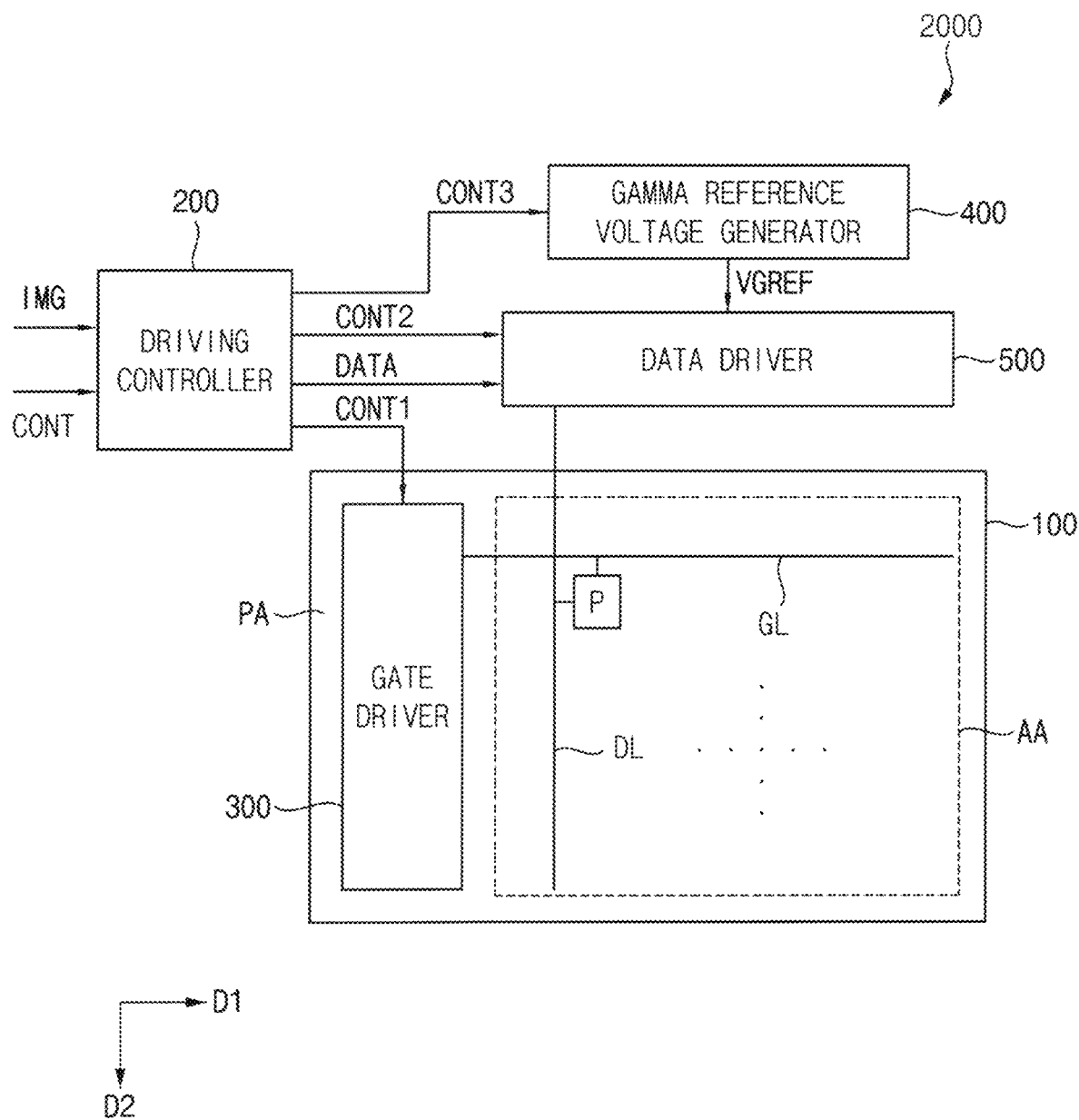
FIG. 2 is a block diagram illustrating a display apparatus of FIG. 1.

FIG. 2 is a block diagram illustrating the display apparatus of FIG. 1.

Referring to FIGS. 1 and 2, an embodiment of the display apparatus 2000 includes a display panel 100 and a display panel driver. The display panel driver includes a driving controller 200, a gate driver 300, a gamma reference voltage generator 400 and a data driver 500.

In one embodiment, for example, the driving controller 200 and the data driver 500 may be integrally formed with each other. In one embodiment, for example, the driving controller 200, the gamma reference voltage generator 400 and the data driver 500 may be integrally formed with each other. In one embodiment, for example, the driving controller 200, the gate driver 300, the gamma reference voltage generator 400 and the data driver 500 may be integrally formed with each other. A driving module in which the driving controller 200 and the data driver 500 are integrally formed may be referred to as a timing controller embedded data driver ("TED").

The display panel 100 includes a display region AA and a peripheral region PA adjacent to the display region AA.

In one embodiment, for example, the display panel 100 may be an organic light emitting diode display panel including organic light emitting diodes. Alternatively, the display panel 100 may be a liquid crystal display panel including liquid crystal molecules.

The display panel 100 includes a plurality of gate lines GL, a plurality of data lines DL and a plurality of pixels P electrically connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. In one embodiment, for example, the driving controller 200 may receive the input image data IMG and the input control signal CONT from a host. The input image data IMG may include red image data, green image data and blue image data. The input image data IMG may further include white image data. Alternatively, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the driving controller 200. The gate driver 300 outputs the gate signals to the gate lines GL. In one embodiment, for example, the gate driver 300 may sequentially output the gate signals to the gate lines GL. In one embodiment, for example, the gate driver 300 may be integrated on the peripheral region PA of the display panel 100. In one embodiment, for example, the gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages in an analog type using the gamma reference voltages VGREF. The data driver 500 outputs the data voltages to the data lines DL. In one embodiment, for example, the data driver 500 may be integrated on the peripheral region PA of the display panel 100. In one embodiment, for example, the data driver 500 may be mounted on the peripheral region PA of the display panel 100.

Figure 3:
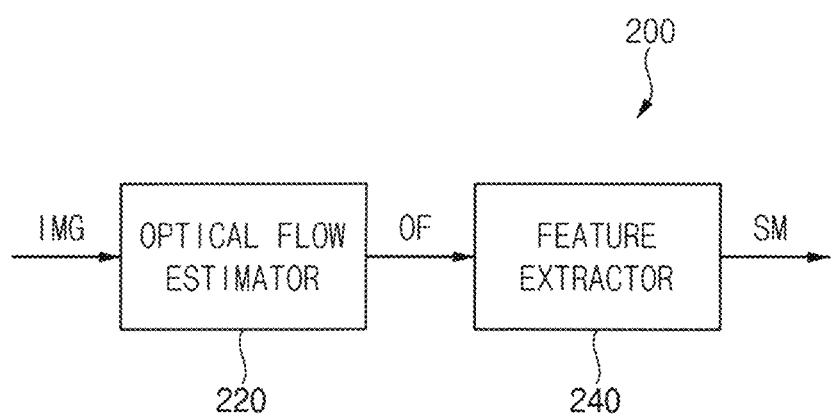
FIG. 3 is a block diagram illustrating the driving controller of FIG. 2.
Figure 4:
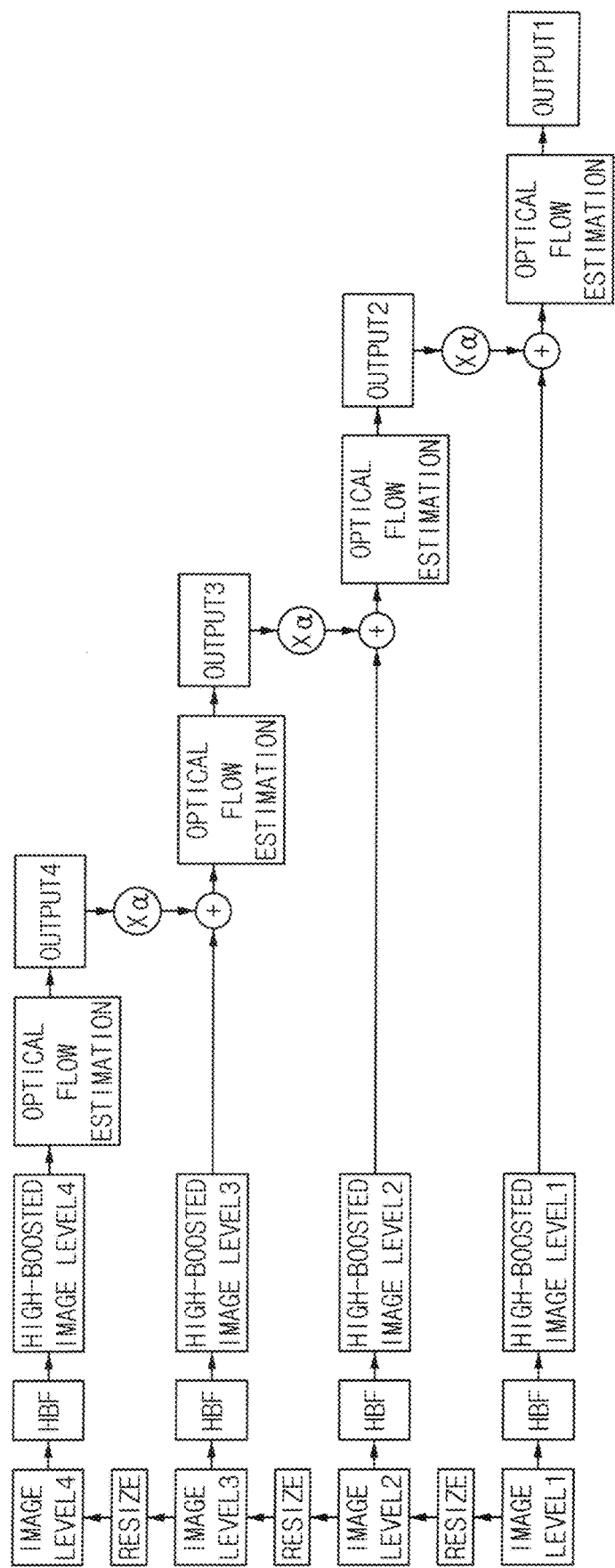
FIG. 4 is a conceptual diagram illustrating an embodiment of an operation of an optical flow estimator of FIG. 3.
Figure 5:
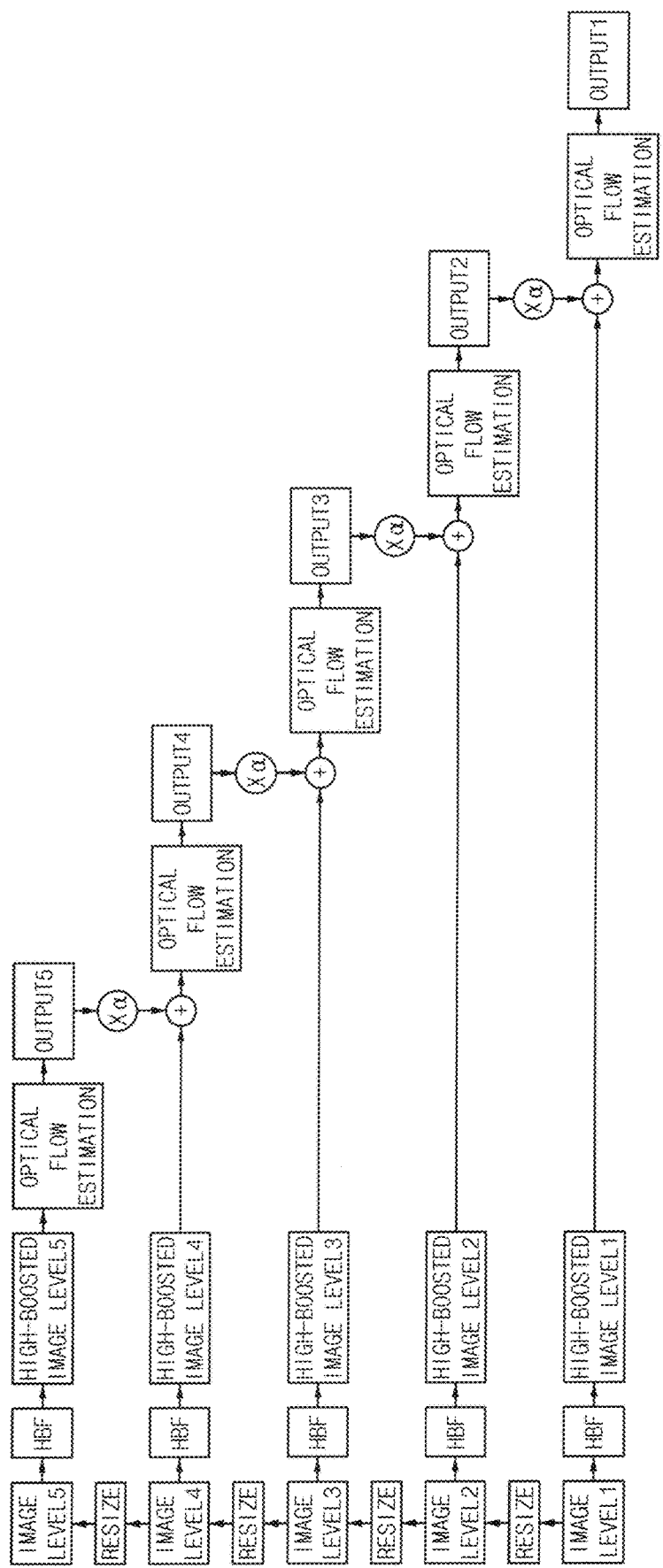
FIG. 5 is a conceptual diagram illustrating an alternative embodiment of an operation of the optical flow estimator of FIG. 3.

FIG. 3 is a block diagram illustrating the driving controller 200 of FIG. 2. FIG. 4 is a conceptual diagram illustrating an embodiment of an operation of an optical flow estimator 220 of FIG. 3. FIG. 5 is a conceptual diagram illustrating an alternative embodiment of an operation of the optical flow estimator 220 of FIG. 3.

Referring to FIGS. 1 to 5, in an embodiment, the driving controller 200 may determine an optical flow OF based on previous frame data of the input image data IMG and present frame data of the input image data IMG and a user's self-motion SM using the optical flow OF.

In one embodiment, as shown in FIG. 3, the driving controller 200 may include an optical flow estimator 220 and a feature extractor 240. The optical flow estimator 220 may determine the optical flow OF based on previous frame data of the input image data IMG and present frame data of the input image data IMG in a unit of a pixel. The feature extractor 240 may extract features to determine a motion type and a motion direction in an image from the optical flow OF.

In one embodiment, for example, as shown in in FIG. 4, an operation structure of the optical flow estimator 220 may include four stages. In such an embodiment, a first stage IMAGE LEVEL1 may estimate a first optical flow using the input image data IMG, a second stage IMAGE LEVEL2 may estimate a second optical flow using first resized data having a reduced size from the input image data IMG, a third stage IMAGE LEVEL3 may estimate a third optical flow using second resized data having a reduced size from the first resized data and a fourth stage IMAGE LEVEL4 may estimate a fourth optical flow using third resized data having a reduced size from the second resized data.

In one alternative embodiment, for example, as shown in FIG. 5, an operation structure of the optical flow estimator 220 may include five stages. In such an embodiment, a first stage IMAGE LEVEL1 may estimate a first optical flow using the input image data IMG, a second stage IMAGE LEVEL2 may estimate a second optical flow using first resized data having a reduced size from the input image data IMG, a third stage IMAGE LEVEL3 may estimate a third optical flow using second resized data having a reduced size from the first resized data, a fourth stage IMAGE LEVEL4 may estimate a fourth optical flow using third resized data having a reduced size from the second resized data and a fifth stage IMAGE LEVEL5 may estimate a fifth optical flow using fourth resized data having a reduced size from the third resized data.

In one embodiment, for example, as shown in FIGS. 4 and 5, the optical flow estimator 220 may apply a high boost filter HBF to the input image data IMG and may determine the first optical flow of first high-boosted image data HIGH-BOOSTED IMAGE LEVEL1 generated by applying the high boost filter HBF to the input image data IMG in the first stage IMAGE LEVEL1.

In an embodiment, as shown in FIGS. 4 and 5, the optical flow estimator 220 may apply the high boost filter HBF to the first resized data having a reduced size from the input image data IMG and may determine the second optical flow of second high-boosted image data HIGH-BOOSTED IMAGE LEVEL2 generated by applying the high boost filter HBF to the first resized data in the second stage IMAGE LEVEL2.

In such an embodiment, as shown in FIGS. 4 and 5, the optical flow estimator 220 may apply the high boost filter HBF to the second resized data having a reduced size from the first resized data and may determine the third optical flow of third high-boosted image data HIGH-BOOSTED IMAGE LEVEL3 generated by applying the high boost filter HBF to the second resized data in the third stage IMAGE LEVEL3.

In such an embodiment, as shown in FIGS. 4 and 5, the optical flow estimator 220 may apply the high boost filter HBF to the third resized data having a reduced size from the second resized data and may determine the fourth optical flow of fourth high-boosted image data HIGH-BOOSTED IMAGE LEVEL4 generated by applying the high boost filter HBF to the third resized data in the fourth stage IMAGE LEVEL4.

In such an embodiment, as shown in FIG. 5, the optical flow estimator 220 may apply the high boost filter HBF to the fourth resized data having a reduced size from the third resized data and may determine the fifth optical flow of fifth high-boosted image data HIGH-BOOSTED IMAGE LEVEL5 generated by applying the high boost filter HBF to the fourth resized data in the fifth stage IMAGE LEVEL5.

The number of stages of the optical flow estimator 220 may vary based on the input image data IMG. In one embodiment, for example, the optical flow estimator 220 may vary the number of resizing operations based on the input image data IMG.

When an amount of computation of the input image data IMG is great and the number of the resizing operations of the optical flow estimator 220 is also great, a speed of the optical flow estimation may decrease due to a load of the computation. Thus, in such an embodiment, when the amount of computation of the input image data IMG is great, the number of the resizing operations of the optical flow estimator 220 may be set to be little.

When a resolution of the input image data IMG is great, a relatively large amount of the resizing operation may be desired for the accuracy of the optical flow estimation. Thus, in such an embodiment, when the resolution of the input image data IMG is great, the number of the resizing operations of the optical flow estimator 220 may be set to be great.

In an embodiment, when the number of the stages of the optical flow estimator 220 is two, the optical flow estimator 220 may estimate the optical flow of the input image data IMG based on the first optical flow and the second optical flow. In one embodiment, for example, the optical flow estimator 220 may estimate the optical flow OUTPUT1 of the input image data IMG by multiplying the second optical flow OUTPUT2 by a weight α and adding the first optical flow thereto. Here, the weight α may be greater than one. When the weight α is greater than one, it means that that a greater weight is set to the second optical flow than the first optical flow to calculate the final optical flow OF.

In such an embodiment, the weight α is used for merging optical flow information of different stages instead of an upscaling operation having a large amount of computation so that the amount of computation may be relatively reduced.

In an embodiment when the number of the stages of the optical flow estimator 220 is three, the optical flow estimator 220 may estimate the optical flow of the input image data IMG based on the first optical flow, the second optical flow and the third optical flow. In one embodiment, for example, the optical flow estimator 220 may obtain an output OUTPUT2 of a second stage by multiplying the third optical flow OUTPUT3 by the weight α and adding the second optical flow thereto and may estimate the optical flow OUTPUT1 of the input image data IMG by multiplying the output OUTPUT2 of the second stage by the weight α and adding the first optical flow thereto. Here, the weight α may be greater than one. When the weight α is greater than one, it means that a greater weight is set to the second optical flow than the first optical flow to calculate the final optical flow OF and that a greater weight is set to the third optical flow than the second optical flow to calculate the final optical flow OF.

In an embodiment, as shown in FIG. 4, when the number of the stages of the optical flow estimator 220 is four, the optical flow estimator 220 may estimate the optical flow of the input image data IMG based on the first optical flow, the second optical flow, the third optical flow and the fourth optical flow. In one embodiment, for example, the optical flow estimator 220 may obtain an output OUTPUT3 of a third stage by multiplying the fourth optical flow OUTPUT4 by the weight α and adding the third optical flow thereto, may obtain an output OUTPUT2 of a second stage by multiplying the third optical flow OUTPUT3 by the weight α and adding the second optical flow thereto and may estimate the optical flow OUTPUT1 of the input image data IMG by multiplying the output OUTPUT2 of the second stage by the weight α and adding the first optical flow thereto. Herein, the weight α may be greater than one. When the weight α is greater than one, it means that a greater weight is set to the second optical flow than the first optical flow to calculate the final optical flow OF, that a greater weight is set to the third optical flow than the second optical flow to calculate the final optical flow OF and that a greater weight is set to the fourth optical flow than the third optical flow to calculate the final optical flow OF. Here, the final optical flow OF may be OUTPUT1 in FIG. 4.

In an embodiment, as shown in FIG. 5, when the number of the stages of the optical flow estimator 220 is five, the optical flow estimator 220 may estimate the optical flow of the input image data IMG based on the first optical flow, the second optical flow, the third optical flow, the fourth optical flow and the fifth optical flow. In one embodiment, for example, the optical flow estimator 220 may obtain an output OUTPUT4 of a fourth stage by multiplying the fifth optical flow OUTPUT5 by the weight α and adding the fourth optical flow thereto, may obtain an output OUTPUT3 of a third stage by multiplying the fourth optical flow OUTPUT4 by the weight α and adding the third optical flow thereto, may obtain an output OUTPUT2 of a second stage by multiplying the third optical flow OUTPUT3 by the weight α and adding the second optical flow thereto and may estimate the optical flow OUTPUT1 of the input image data IMG by multiplying the output OUTPUT2 of the second stage by the weight α and adding the first optical flow thereto. Here, the weight α may be greater than one. When the weight α is greater than one, it means that a greater weight is set to the second optical flow than the first optical flow to calculate the final optical flow OF, that a greater weight is set to the third optical flow than the second optical flow to calculate the final optical flow OF, that a greater weight is set to the fourth optical flow than the third optical flow to calculate the final optical flow OF and that a greater weight is set to the fifth optical flow than the fourth optical flow to calculate the final optical flow OF. Here, the final optical flow OF may be OUTPUT1 in FIG. 5.

In one embodiment, for example, in the resizing process, the resolution may be reduced by ½ in a horizontal direction and ½ in a vertical direction. When the input image data IMG has a full high definition ("HD") resolution (1920× 1080), the resolution of the first resized data may be 960× 540, the resolution of the second resized data may be 480×270, the resolution of the third resized data may be 240×135 and the resolution of the fourth resized data may be 120×67.

In such an embodiment, the optical flow may be estimated through an optical flow estimation structure having a plurality of resizing stages to simultaneously estimate motions of various sizes in the image. The high boost filter may be applied in each of the stages to enhance information on important features (e.g. edge information, corner points, etc.) in the image which may be lost at a higher image level.

The high boost filter may enhance the edge information and corner point information (high-frequency information) corresponding to the important features while maintaining texture information (low-frequency information).

When the input image data IMG is denoted by ORIGINAL, a result of applying a low pass filter to the input image data IMG is denoted by LOW PASS, a high boost parameter is denoted by β, a result of applying the high boost filter to the input image data IMG is denoted by HIGH BOOST, the following equation is satisfied: HIGH BOOST=β×ORIGINAL−LOW PASS.

In addition, when the input image data IMG is denoted by ORIGINAL, a result of applying a high pass filter to the input image data IMG is denoted by HIGH PASS, the high boost parameter is denoted by β, the result of applying the high boost filter to the input image data IMG is denoted by HIGH BOOST, the following equation is satisfied: HIGH BOOST=(β−1)×ORIGINAL+HIGH PASS.

Here, the high boost parameter β may be set to greater than one. When the high boost parameter β is one, the high boost filter may be same as the high pass filter. When the high boost filter having the high boost parameter β greater than one is applied to original data, the edge of the original data may be emphasized and the original data may include the texture information.

Figure 6:
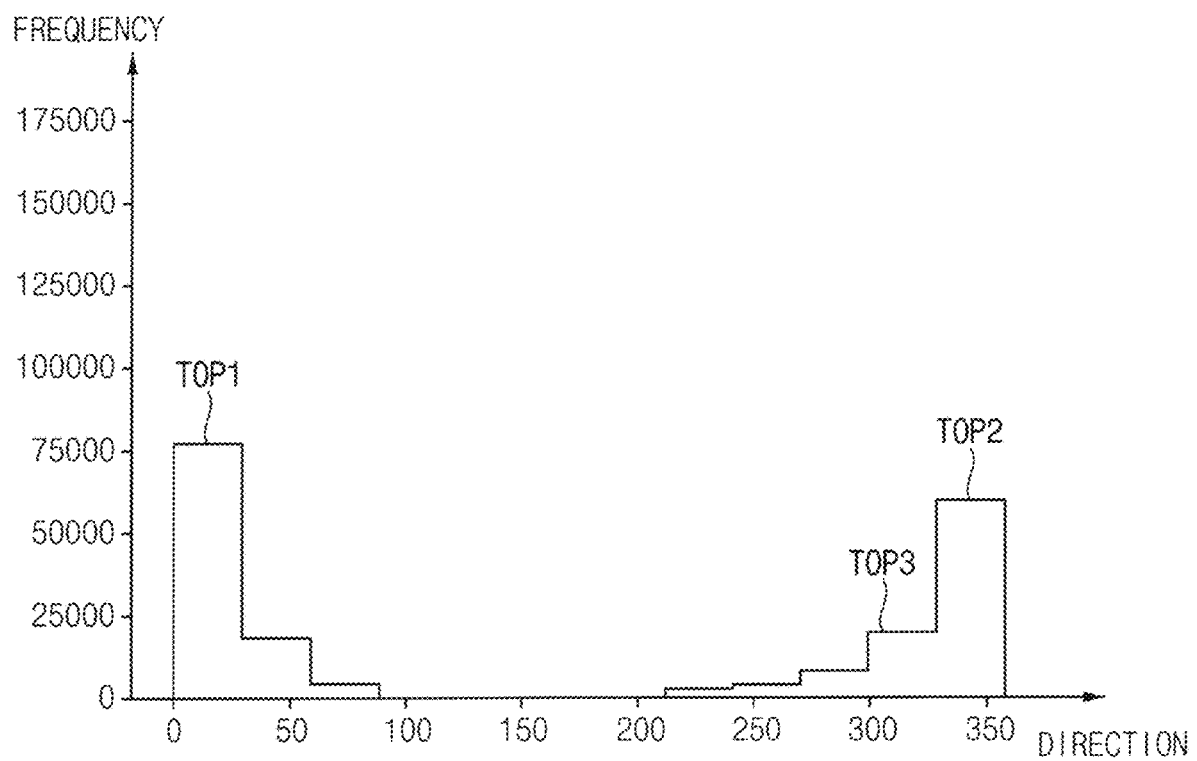
FIG. 6 is a conceptual diagram illustrating a direction histogram generated by a feature extractor of FIG. 3.
Figure 7:
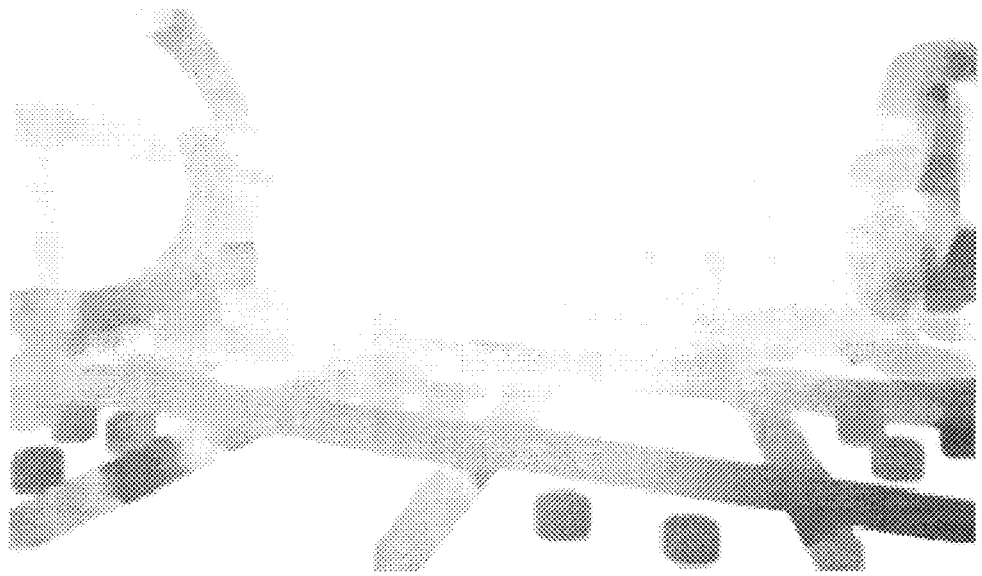
FIG. 7 is a conceptual diagram illustrating a saliency map generated by the feature extractor of FIG. 3.
Figure 8:
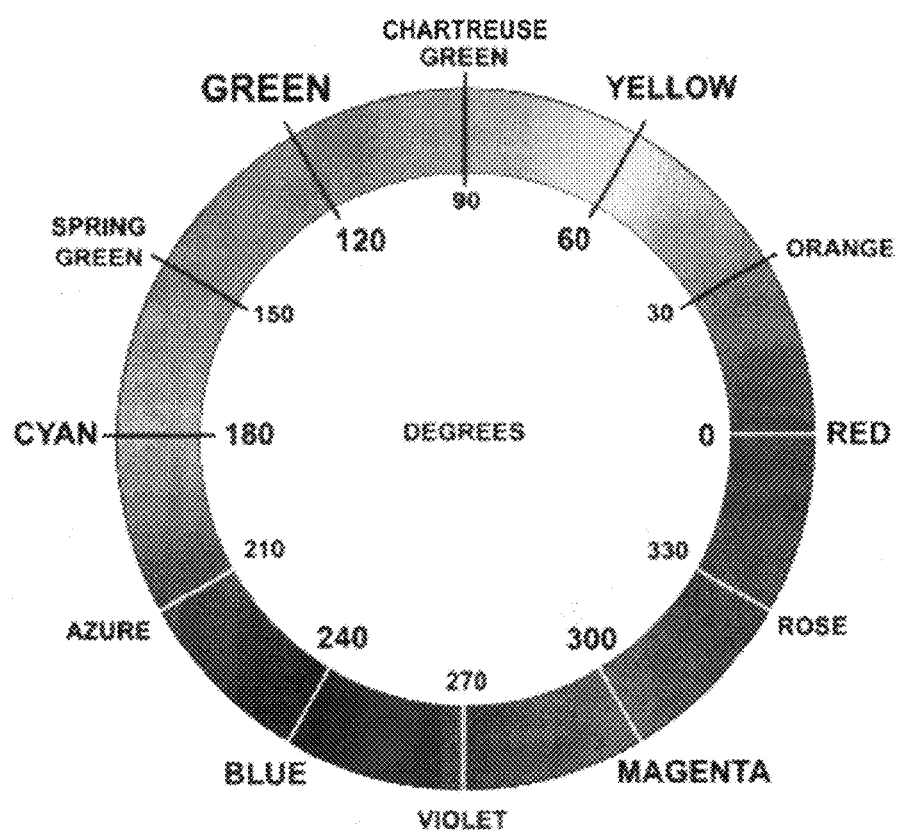
FIG. 8 is a conceptual diagram illustrating colors of the saliency map of FIG. 7.
Figure 9:
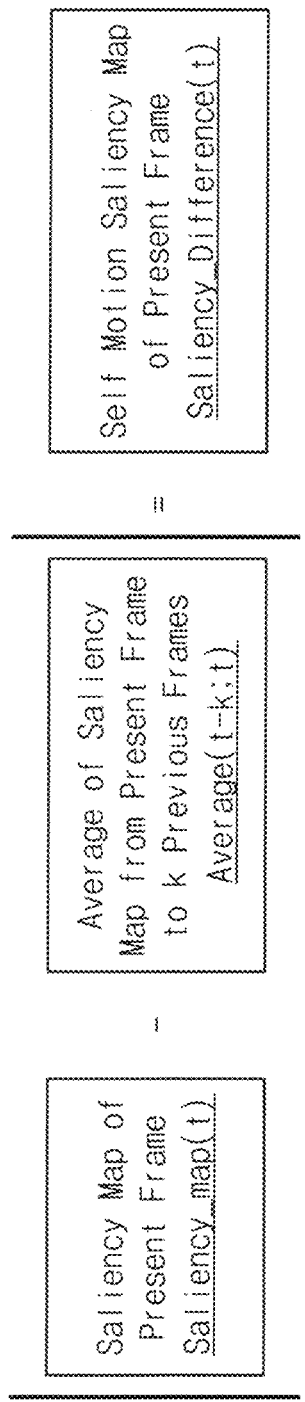
FIG. 9 is a conceptual diagram illustrating an embodiment of a method of calculating a self-motion saliency map generated by the feature extractor of FIG. 3.

FIG. 6 is a conceptual diagram illustrating a direction histogram generated by a feature extractor 240 of FIG. 3. FIG. 7 is a conceptual diagram illustrating a saliency map generated by the feature extractor 240 of FIG. 3. FIG. 8 is a conceptual diagram illustrating colors of the saliency map of FIG. 7. FIG. 9 is a conceptual diagram illustrating a method of calculating a self-motion saliency map generated by the feature extractor 240 of FIG. 3.

Referring to FIGS. 1 to 9, in an embodiment, the feature extractor 240 may extract features to determine a motion type and a motion direction in the image from the optical flow OF.

In one embodiment, for example, the feature extractor 240 may generate a saliency map representing the motion direction and a motion magnitude in the image from the optical flow OF.

The saliency map is as shown in FIG. 7. The color of the saliency map indicates the motion direction and light and dark degree of the color of the saliency map indicates the motion magnitude. A white portion in the saliency map represents that the motion magnitude is zero.

As shown in FIG. 8, for example, RED represents the motion direction of 0 degree, CHARTREUSE GREEN represents the motion direction of 90 degrees, CYAN represents the motion direction of 180 degrees and VIOLET represents the motion direction of 270 degrees in the saliency map.

The feature extractor 240 may generate the self-motion saliency map to remove a noise from the saliency map. As shown in FIG. 9, when the saliency map of present frame data is denoted by Saliency_map(t), an average of the saliency map from a present frame to k previous frames is denoted by Average(t-k;t), and a self-motion saliency map of the present frame data is denoted by Saliency_Difference(t), a following equation is satisfied: |Saliency_map(t)−Average(t-k;t)|=Saliency_Difference(t). When the average of the saliency map from the present frame to the k previous frames is removed from the saliency map, a background motion (e.g. a noise) caused from moving objects and surrounding environment among motions in the saliency map may be removed.

In addition, as shown in FIG. 6, the feature extractor 240 may generate a histogram of direction representing the frequency of each direction of the optical flow OF. In one embodiment, for example, the feature extractor 240 may generate the histogram of direction using the saliency map. In one embodiment, for example, the feature extractor 240 may generate the histogram of direction using the self-motion saliency map from which the noise is removed.

In one embodiment, for example, when all of the components of the histogram of direction are less than a threshold value, the feature extractor 240 may determine the present frame data as a scene motion in which the user's motion is less. When all of the components of the histogram of direction are less than the threshold value, it may be determined that the image does not have a strong motion in a specific direction. When the image does not have a strong motion in a specific direction, it may be determined that the user's motion is less.

In one embodiment, for example, when at least one of the components of the histogram of direction is greater than the threshold value, the feature extractor 240 may determine that the present frame data include the user's self-motion. When at least one of the components of the histogram of direction is greater than the threshold value, it may be determined that the image has a strong motion in a specific direction. When the image has a strong motion in a specific direction, it may be determined that the user's self-motion exists.

When at least one of the components of the histogram of direction is greater than the threshold value, the feature extractor 240 may determine a direction TOP1 having the greatest frequency among the components of the histogram of direction as a direction of the user's self-motion.

Alternatively, when at least one of the components of the histogram of direction is greater than the threshold value, the feature extractor 240 may determine three directions TOP1, TOP2 and TOP3 having the greatest frequencies among the components of the histogram of direction as directions of the user's self-motion.

FIG. 10 is a table illustrating estimation accuracies of a user's self-motion according to a comparative embodiment and a present embodiment. FIG. 11 is a table illustrating estimation times (estimation speeds) of the user's self-motion according to a comparative embodiment and an embodiment according to the invention (hereinafter, present embodiment).

Unlike the present embodiment, the optical flow estimation may be directly applied to the image data without the high boost filtering in the comparative embodiment. In addition, unlike the present embodiment, the weight α may not be used for the optical flow operation between different stages in the comparative embodiment.

Referring to FIGS. 1 to 11, when the user's self-motion is predicted in the direction (TOP1) having the greatest frequency among the components of the histogram of direction using the third stage LEVEL 3 in the comparative embodiment, the accuracy of the user's self-motion is 41.7%. When the user's self-motion is predicted in the three directions (TOP3) having the greatest frequencies among the components of the histogram of direction using the third stage LEVEL 3 in the comparative embodiment, the accuracy of the user's self-motion is 66.0%. Here, an error distance between the predicted self-motion and the actual self-motion is 1.266.

When the user's self-motion is predicted in the direction (TOP1) having the greatest frequency among the components of the histogram of direction using the third stage LEVEL 3 in the present embodiment, the accuracy of the user's self-motion is 71.5%. When the user's self-motion is predicted in the three directions (TOP3) having the greatest frequencies among the components of the histogram of direction using the third stage LEVEL 3 in the present embodiment, the accuracy of the user's self-motion is 95.2%. Here, an error distance between the predicted self-motion and the actual self-motion is 0.508.

When the user's self-motion is predicted in the direction (TOP1) having the greatest frequency among the components of the histogram of direction using the fourth stage LEVEL 4 in the comparative embodiment, the accuracy of the user's self-motion is 74.9%. When the user's self-motion is predicted in the three directions (TOP3) having the greatest frequencies among the components of the histogram of direction using the fourth stage LEVEL 4 in the comparative embodiment, the accuracy of the user's self-motion is 96.5%. Here, an error distance between the predicted self-motion and the actual self-motion is 0.440.

When the user's self-motion is predicted in the direction (TOP1) having the greatest frequency among the components of the histogram of direction using the fourth stage LEVEL 4 in the present embodiment, the accuracy of the user's self-motion is 76.0%. When the user's self-motion is predicted in the three directions (TOP3) having the greatest frequencies among the components of the histogram of direction using the fourth stage LEVEL 4 in the present embodiment, the accuracy of the user's self-motion is 97.0%. Here, an error distance between the predicted self-motion and the actual self-motion is 0.429.

When the user's self-motion is predicted in the direction (TOP1) having the greatest frequency among the components of the histogram of direction using the fifth stage LEVEL 5 in the comparative embodiment, the accuracy of the user's self-motion is 65.0%. When the user's self-motion is predicted in the three directions (TOP3) having the greatest frequencies among the components of the histogram of direction using the fifth stage LEVEL 5 in the comparative embodiment, the accuracy of the user's self-motion is 92.0%. Here, an error distance between the predicted self-motion and the actual self-motion is 0.551.

When the user's self-motion is predicted in the direction (TOP1) having the greatest frequency among the components of the histogram of direction using the fifth stage LEVEL 5 in the present embodiment, the accuracy of the user's self-motion is 75.5%. When the user's self-motion is predicted in the three directions (TOP3) having the greatest frequencies among the components of the histogram of direction using the fifth stage LEVEL 5 in the present embodiment, the accuracy of the user's self-motion is 96.9%. Here, an error distance between the predicted self-motion and the actual self-motion is 0.436.

As described above, the accuracy of the prediction of the user's self-motion of the embodiment was measured to be greater than the accuracy of the prediction of the user's self-motion of the comparative embodiment.

In the comparative embodiment, estimation times of the optical flow for a first map MAP1 and a second map MAP2 are measured as 28.3 milliseconds (ms) and 28.6 ms respectively. An average of the estimation times of the optical flow of the comparative embodiment for the first map MAP1 and the second map MAP2 is 28.5 ms. In the comparative embodiment, only the third stage LEVEL 3 is used for estimation of the optical flow and the case that only the third stage LEVEL 3 is used for estimation of the optical flow is represented as LEVEL 3 in FIG. 11 for the comparative embodiment.

In the present embodiment, estimation times of the optical flow for the first map MAP1 and the second map MAP2 are measured as 31.0 ms and 34.3 ms respectively. An average of the estimation times of the optical flow of the present embodiment for the first map MAP1 and the second map MAP2 is 32.6 ms. In the present embodiment, the first to third stages are used for estimation of the optical flow and the case that the first to third stages are used for estimation of the optical flow is represented as LEVEL 3 in FIG. 11 for the present embodiment.

In the comparative embodiment using only the fourth stage LEVEL 4, estimation times of the optical flow for the first map MAP1 and the second map MAP2 are measured as 7.5 ms and 7.0 ms respectively. An average of the estimation times of the optical flow of the comparative embodiment using only the fourth stage LEVEL 4 for the first map MAP1 and the second map MAP2 is 7.3 ms.

In the present embodiment using only the fourth stage LEVEL 4, estimation times of the optical flow for the first map MAP1 and the second map MAP2 are measured as 7.5 ms and 7.7 ms respectively. An average of the estimation times of the optical flow of the present embodiment using only the fourth stage LEVEL 4 for the first map MAP1 and the second map MAP2 is 7.6 ms.

In the comparative embodiment using only the fifth stage LEVEL 5, estimation times of the optical flow for the first map MAP1 and the second map MAP2 are measured as 1.4 ms and 1.4 ms respectively. An average of the estimation times of the optical flow of the comparative embodiment using only the fifth stage LEVEL 5 for the first map MAP1 and the second map MAP2 is 1.4 ms.

In the present embodiment using only the fifth stage LEVEL 5, estimation times of the optical flow for the first map MAP1 and the second map MAP2 are measured as 1.4 ms and 1.4 ms respectively. An average of the estimation times of the optical flow of the present embodiment using only the fifth stage LEVEL 5 for the first map MAP1 and the second map MAP2 is 1.4 ms.

In LEVEL 3 of the present embodiment using all of the first to third stages, the estimation time is slightly increased due to the computation time for integrating the results at the higher levels, but it is capable of processing 130 frames per second on average, so there is no problem in the operation in the actual display system. In addition, it is possible to process more frames by improving the speed through optimizing an image loading process and an image processing process.

According to an embodiment, as described above, the input image data IMG provided to the user may be analyzed and the user's self-motion may be estimated based only on the analyzed input image data IMG in a real time. The amount of computation for estimating the user's self-motion SM may be reduced and the accuracy of the estimation of the user's self-motion SM may be enhanced.

In such an embodiment, the user's self-motion SM may be estimated based only on the input image data IMG so that the user's self-motion SM may be estimated without a head tracking apparatus or an acceleration sensor.

In such an embodiment, based on the user's self-motion estimation, the motion sickness and the dizziness which may be occurred to the user in the virtual reality display system may be reduced.

According to embodiments of the display apparatus, the virtual reality display system and the method of estimating the user motion based on the input image, the user's self-motion may be estimated based on the input image without using a sensor.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:
a display panel which displays an image based on input image data;
a driving controller which generates a data signal based on the input image data, determines an optical flow based on previous frame data of the input image data and present frame data of the input image data and determines a user's self-motion based on the optical flow; and
a data driver which converts the data signal to a data voltage and outputs the data voltage to the display panel,
wherein the driving controller comprises an optical flow estimator which applies a high boost filter to the input image data and determines a first optical flow of first high-boosted image data generated by applying the high boost filter to the input image data, applies the high boost filter to first resized data having a reduced size from the input image data and determines a second optical flow of second high-boosted image data generated by applying the high boost filter to the first resized data, and estimates the optical flow of the input image data based on the first optical flow and the second optical flow.

2. The display apparatus of claim 1, wherein the driving controller further comprises:
a feature extractor which extracts features to determine a motion type and a motion direction in the image from the optical flow.

3. The display apparatus of claim 2, wherein the feature extractor generates a saliency map representing the motion direction and a motion magnitude in the image from the optical flow.

4. The display apparatus of claim 3, wherein when the saliency map of the present frame data is denoted by Saliency_map(t), an average of the saliency map from a present frame to k previous frames is denoted by Average(t-k;t), and a self-motion saliency map of the present frame data is denoted by Saliency_Difference(t), the following equation is satisfied: |Saliency_map(t)−Average(t-k;t)|=Saliency_Difference(t).

5. The display apparatus of claim 2, wherein the feature extractor generates a histogram of direction representing a frequency of each direction of the optical flow.

6. The display apparatus of claim 5, wherein when all of components of the histogram of direction are less than a threshold value, the feature extractor determines the present frame data as a scene motion in which the user's self-motion is less.

7. The display apparatus of claim 6, wherein when at least one of the components of the histogram of direction is greater than the threshold value, the feature extractor determines that the present frame data include the user's self-motion.

8. The display apparatus of claim 7, wherein when at least one of the components of the histogram of direction is greater than the threshold value, the feature extractor determine a direction having a greatest frequency among the components of the histogram of direction as a direction of the user's self-motion.

9. The display apparatus of claim 5, wherein the optical flow estimator estimates the optical flow of the input image data by multiplying the second optical flow by a weight and adding the first optical flow thereto.

10. The display apparatus of claim 9, wherein the weight is greater than one.

11. The display apparatus of claim 3,
wherein the optical flow estimator applies the high boost filter to second resized data having a reduced size from the first resized data and determines a third optical flow of third high-boosted image data generated by applying the high boost filter to the second resized data, and
wherein the optical flow estimator estimates the optical flow of the input image data based on the first optical flow, the second optical flow and the third optical flow.

12. The display apparatus of claim 11,
wherein the optical flow estimator applies the high boost filter to third resized data having a reduced size from the second resized data and determines a fourth optical flow of fourth high-boosted image data generated by applying the high boost filter to the third resized data, and
wherein the optical flow estimator estimates the optical flow of the input image data based on the first optical flow, the second optical flow, the third optical flow and the fourth optical flow.

13. The display apparatus of claim 12, wherein the optical flow estimator varies a number of resizing operations based on the input image data.

14. The display apparatus of claim 1, wherein when the input image data is denoted by ORIGINAL, a result of applying a low pass filter to the input image data is denoted by LOW PASS, a high boost parameter is denoted by β, a result of applying the high boost filter to the input image data is denoted by HIGH BOOST, the following equation is satisfied: HIGH BOOST=β×ORIGINAL−LOW PASS.

15. The display apparatus of claim 14, wherein the high boost parameter is greater than one.

16. A virtual reality display system comprising:
a lens unit;
a display apparatus comprising:
a display panel which displays an image based on input image data;
a driving controller which generates a data signal based on the input image data, determines an optical flow based on previous frame data of the input image data and present frame data of the input image data and determines a user's self-motion using the optical flow; and
a data driver which converts the data signal to a data voltage and outputs the data voltage to the display panel; and
a housing which receives the lens unit and the display apparatus,
wherein the driving controller comprises an optical flow estimator which applies a high boost filter to the input image data and determines a first optical flow of first high-boosted image data generated by applying the high boost filter to the input image data, applies the high boost filter to first resized data having a reduced size from the input image data and determines a second optical flow of second high-boosted image data generated by applying the high boost filter to the first resized data, and estimates the optical flow of the input image data based on the first optical flow and the second optical flow.

17. A method of estimating a user motion based on an input image, the method comprising:

determining an optical flow based on previous frame data of input image data and present frame data of the input image data in a unit of a pixel;

extracting features from the optical flow to determine a motion type and a motion direction in the input image; and determining a user's self-motion using the features, wherein the determining the optical flow in the unit of the pixel comprises:

applying a high boost filter to the input image data;

determining a first optical flow of first high-boosted image data generated by applying the high boost filter to the input image data;

generating first resized data having a reduced size from the input image data;

applying the high boost filter to the first resized data;

determining a second optical flow of second high-boosted image data generated by applying the high boost filter to the first resized data; and determining the optical flow based on the first optical flow and the second optical flow.

18. The method of claim 17, wherein the extracting features from the optical flow comprises generating a histogram of direction representing a frequency of each direction of the optical flow, wherein the determining the user's self-motion using the features comprises determining that the present frame data include the user's self-motion when at least one of components of the histogram of direction is greater than a threshold value.

\* \* \* \* \*